United States Patent [19]

Rawlings

[11] Patent Number: 4,551,086
[45] Date of Patent: Nov. 5, 1985

[54] DEVICE FOR CENTRIFUGALLY CASTING ARTICLES

[75] Inventor: David L. Rawlings, Bayville, N.Y.
[73] Assignee: International Hydron Corporation, New York, N.Y.
[21] Appl. No.: 512,814
[22] Filed: Jul. 11, 1983
[51] Int. Cl.[4] .............................................. B29D 11/00
[52] U.S. Cl. ..................................... 425/425; 264/2.1; 264/197.8; 425/434; 425/435; 425/808
[58] Field of Search ............................. 264/2.1, 297.8; 425/808, 434, 425, 259, 261, 534, 435, 430, 256

[56] References Cited

U.S. PATENT DOCUMENTS

| | | | |
|---|---|---|---|
| 2,675,584 | 4/1954 | Fienberg et al. | 425/259 |
| 2,914,799 | 12/1959 | Canfield | 425/261 |
| 3,257,685 | 6/1966 | Bütow et al. | 425/261 |
| 3,660,545 | 5/1972 | Wichterle | 264/1.4 |
| 3,905,735 | 9/1975 | Thomas et al. | 425/256 |
| 4,304,543 | 12/1981 | Rolniciak et al. | 425/534 |
| 4,310,282 | 1/1982 | Spurr et al. | 425/533 |
| 4,470,797 | 9/1984 | Harry et al. | 425/526 |

Primary Examiner—Jay H. Woo
Assistant Examiner—J. Fortenberry
Attorney, Agent, or Firm—Vincent P. Pirri

[57] ABSTRACT

An apparatus and method for feeding molds to a device for centrifugally casting a plurality of axially symmetrical or asymmetrical articles such as lenses, disc valves, and the like on a continuous basis.

15 Claims, 8 Drawing Figures

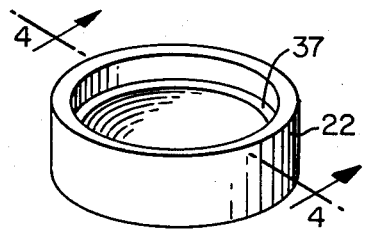
FIG. 3    FIG. 4
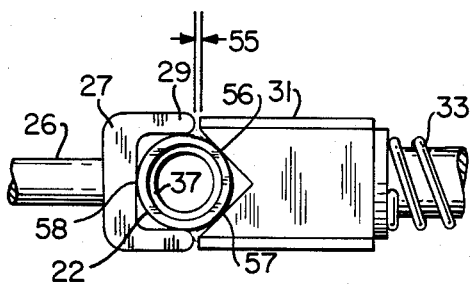
FIG. 5
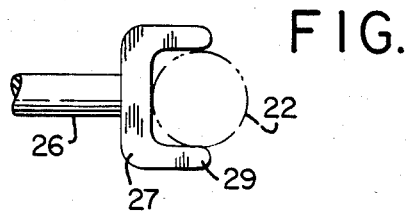
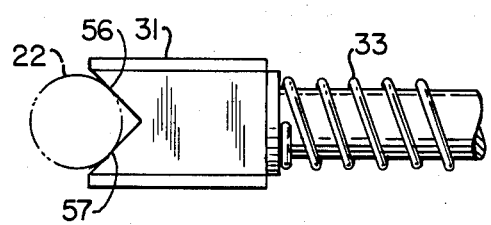
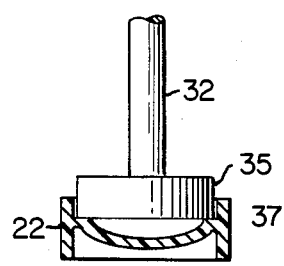
FIG. 6    FIG. 8

DEVICE FOR CENTRIFUGALLY CASTING ARTICLES

DESCRIPTION

1. Technical Field

The present invention relates to an apparatus and method for feeding molds to a device for centrifugally casting a plurality of axially symmetrical or asymmetrical articles such as lenses, disc valves, and the like.

In a specific aspect, the present invention provides an improvement in an apparatus and method for feeding molds into a device which employs a rotatable polymerization column adapted to accommodate a number of vertically arranged molds within said polymerization column, and having advancing means for positioning a mold containing a polymerizable or curable composition into alignment with the inlet end of the polymerization column; displacement means for feeding an advanced mold into the inlet end of the polymerization column and apparatus control and motive means.

2. Background Art

At present, centrifugal casting, such as polymerization-casting of axially symmetrical objects, such as e.g. lenses, artificial heart valve substitutes, etc., can be performed by several techniques.

One such technique utilizes equipment having individually rotating molds which contain the polymerization reactants and which are adapted to be rotated around their vertical axis. Rotation of each mold at a specifically determined speed creates a centrifugal force which causes the liquid reactants in the mold to generally assume the desired shape of the cavity of the mold that is contacted by the reactant composition. The molds can be grouped in linear array or alternatively can be assembled in carousel arrangement and individually rotated. This technique of operation along with various compositions that can be used in the spin casting of various objects are disclosed in U.S. Pat. No. 3,660,545 issued on May 2, 1972. This reference is incorporated herein by reference.

In another technique a rotatable polymerization tube is used which is adapted to receive a plurality of molds seated tightly to one another and each containing polymerization reactants. The molds are gravity fed into the upper end of the polymerization tube and free fall through the tube. The exit end of the tube is seated tightly on a revolving member which imparts rotation to the tube. As the polymerization tube is rotated, a gas is fed upwards through the polymerization tube about the free falling rotating molds.

In a copending application Ser. No. 491,159 filed on May 4, 1983, now Pat. No. 4,516,924 issued May 14, 1985 and assigned to the same assignee of the subject application, an improvement in the above-described rotatable polymerization tube and free falling mold arrangement is disclosed. Specifically, at the end position of the polymerization tube, retaining means are employed to improve the synchronization of the rotation of the molds with the rotation of the tube.

In a copending application Ser. No. 490,634 filed on May 2, 1983, now U.S. Pat. No. 4,517,138 issued May 14, 1985 and assigned to the same assignee of the subject application, an improvement in the above-described devices employing a rotatable polymerization tube adapted to accommodate a plurality of vertically arranged molds is disclosed. Specifically, a device is disclosed for centrifugally casting of articles which comprises a rotatable polymerization tube adapted for rotation about a vertical axis and adapted for receiving in vertical series a plurality of molds containing a polymerizable or curable composition. The device is provided with securing means for securing a plurality of molds in vertical series in an interference fitting and sliding relationship within the tube, the securing means being adapted to concentrically dispose the molds to the vertical axis of the polymerization tube. Gas flow means are associated with the inner surface of the tube and the outer wall of the molds to accommodate a flow of a gaseous medium through the polymerization tube. The device is operable so that rotation of the tube causes the synchronized rotation of the molds while maintaining the concentricity of the molds to the axis of the polymerization tube until at least the polymerizable or curable composition in each mold is spin cast into a predetermined shaped article.

The securing means which secure the molds within the polymerization tube can be at least two spaced apart longitudinal projections on the inner surface of the polymerization tube or on the outer wall of the molds forming an interference fit therebetween. The projections on the tube or mold could form an integral part of the tube or mold and be made of the same material, or the projections could be a separate component secured to the inner surface of the tube or the outer wall of the mold in a conventional manner using an adhesive or the like. The material constituting the projections can be hard or resilient as long as the molds and inner wall of the tube cooperate to provide an interference fit therebetween.

In another copending application Ser. No. 490,642 filed on May 2, 1983 now U.S. Pat. No. 4,517,139 issued May 14, 1985 and assigned to the same assignee of the subject application, an improvement over the "interference fit" arrangement of the molds is described. Briefly, the invention disclosed in Ser. No. 490,642, now U.S. Pat. No. 4,517,139 relates to a device for centrifugally casting symmetrical or asymmetrical articles comprising a rotatable polymerization column adapted for accommodating and restraining a plurality of molds within said polymerization column; advancing means for intermittently positioning a mold containing a polymerizable or curable composition into alignment with the inlet end of said polymerization tube; displacement means for intermittently force feeding an advanced mold into the inlet end of the polymerization column; and control means for synchronizing and repeating the cycle of the advancing means followed by said displacement means such that after a mold is positioned over the inlet end of the polymerization column, the mold is automatically forced into the polymerization column thereby causing the series aligned molds therein to be displaced by a sufficient amount so as to eject the bottommost mold from the outlet end of the polymerizable column and the time interval between the cycle being sufficient so that the polymerization or curable composition in the bottommost mold is at least substantially formed into a predetermined shaped article.

All of the disclosures made in the above copending applications Ser. Nos. 491,159, 490,634, and 490,642, now U.S. Pat. No. 4,516,924, 4,517,138, and 4,517,139, are incorporated by reference herein as if such disclosure was set out in full text.

An object of the present invention is to provide a novel mold advancing means cooperatively associated with mold feeding means for use with devices such as described in the above disclosures, copending U.S. applications Ser. Nos. 491,159, 490,634, and 490,642, now U.S. Pat. No. 4,516,924, 4,517,138, and 4,517,139, which employ a polymerization tube adapted to accommodate a plurality of vertically arranged molds within said polymerization column or tube.

It is another object of the present invention to provide a device and method for centrifugally casting quality reproducible symmetrical or asymmetrical articles, such as lenses, on a continuous basis.

It is another object of the present invention to provide a centrifugal casting device and method employing a novel arrangement of mold advancing means and mold feeding means which permit advancement of the mold without horizontal angular displacement when aligned over the inlet of the polymerization column.

DISCLOSURE OF THE INVENTION

The invention relates to an improvement in a device for centrifugally casting symmetrical or asymmetrical articles said device having a rotatable polymerization column adapted for accommodating a plurality of molds within said polymerization column; advancing means for positioning a mold containing a polymerizable or curable composition into alignment with the inlet end of said polymerization column; displacement means for feeding said advanced mold into said inlet end of said polymerization column; and control and motor means for operating said advancing means and displacement means and for rotating said column, the improvement wherein said advancing means include pusher means for advancing said mold into alignment with the inlet end of said column, said pusher means being adapted to accommodate a portion of said mold, and jaw means cooperating with said pusher means to envelope said mold in a manner such as to prevent horizontal angular displacement of said mold when said mold is in alignment with said inlet end and wherein said displacement means for feeding said advanced mold into said inlet includes a pusher element having an end portion adapted to be inserted into said mold for directing said mold into said inlet portion of said column.

The pusher means includes a pusher arm having an end portion of "U" shaped configuration defining a pair of fingers which accommodates a portion of the mold in sliding relationship.

The jaw means includes an opposing spring loaded "V" jaw which is adapted to engage the mold before it arrives at a position where it could tilt into the inlet end of the polymerization column.

In general, the jaw means cooperate with the pusher means so that the mold is prevented from tilting into the inlet end of the column and when the mold is positioned over the column, the displacement means are now ready to urge the mold into the inlet.

In a preferred aspect, the displacement means includes a freely rotatable end portion which generally has an outer periphery corresponding in configuration to the inner configuration of the mold and which has a diameter less than the diameter of the mold. The end portion is provided with a terminal end which contacts a flange portion interiorly of the mold when the displacement means are urged towards the inlet.

The dimensions of the jaw means and fingers are such that the jaw means are prevented from contacting the end portion of the displacement means after a mold is inserted into the inlet.

The invention also relates to a method for feeding molds into the inlet end of a centrifugal casting device comprising the steps of:

(a) advancing a mold substantially perpendicular to the longitudinal axis of said inlet, (b) directing said mold to a position over said inlet while maintaining said mold in a position such that the mold is in concentric relation to the inlet and, (c) directing said mold into said inlet while maintaining said mold concentric to said inlet.

Desirably, although not shown in the drawing, the device can have conventional gas feed means for directing a gaseous medium through the rotating column containing the rotating molds. It is preferred that in the spin casting of soft contact lenses, the gaseous medium be an inert gas such as argon or nitrogen. This is due to the fact that undesirable oxygen entrained within the column during polymerization will inhibit the polymerization process and could result in a product of unacceptable quality. A feed of inert gas, such nitrogen, through the polymerization column will purge any entrained oxygen and provide an inert environment for the polymerization process to occur.

It is to be understood that the term "polymerization column" (tube) as used herein includes a tube at least a portion of which includes a polymerization zone as well as a conditioning zone, or a tube which includes a conditioning zone associated with or coaxially mounted to a tube which includes a polymerization zone and a conditioning zone from a source not associated therewith, and similar arrangements. The conditioning tube (zone) preferably can be rotated at the same speed as the polymerization tube (zone). A primary benefit in the use of a conditioning tube in conjunction with a polymerization tube is that the centrifugal forces generated by the rotation of the tubes cause the radially outward displaced liquid polymerizable or curable composition in the mold cavity to assume or maintain the desired shape of the article to be formed prior to being polymerized in the polymerization tube. The hollow cross-sectional area of the tube and the horizontal or lateral cross-sectional area of the molds can assume any regular or irregular polygonal shape as for example, circular, square, rectangular, triangular, and the like provided that the mold can be retained in position over the inlet by the jaw means and pusher means as disclosed herein. Although the invention can be practiced in various types of spin casting apparatus e.g., free falling mode type or the mold interference fit type, the invention is particularly suitable for the latter type and particularly with the device described in copending application Ser. No. 490,634, now U.S. Pat. No. 4,517,138 mentioned previously. Thus a requirement for the polymerization column and the molds is that they cooperate to provide restraining means therebetween to secure a vertically aligned series of molds from exiting the outlet end of the columns by the force of gravity. Accordingly, the molds will be ejected from the column only under a positive force imparted through the force feeding of the molds into the column.

The control means used in the preferred device can be of the conventional type such as a step wheel, timer, cam arrangement, and the like, as long as it synchronizes the activation of the advancing means followed by activation of the displacement means and repeats this cycle after a sufficient time period to cause the polymerization process to be at least substantially completed for the reactant composition in the bottommost mold. In the initial set up of the device of this invention, it would be advisable to fill the polymerization column with dummy molds (molds that do not have any polymerizable or curable composition). Then the first mold force fed into the filled up column would contain the polymerizable or curable composition and would intermittently descend through the polymerization column for a sufficient time period to have its polymerizable or curable composition at least substantially formed into a predetermined shaped article.

By the practice of the invention contemplated herein, molds can be precision fed to produce precision articles of predetermined and exacting details and dimensions e.g., small medical devices such as heart valves and diaphragms; contact lenses, and the like. Such articles, depending on the ultimate use, can be hard, flexible, or soft and can be hydrophilic or hydrophobic. In particular, the novel feed means and method can be used in a novel device to manufacture a wide variety of contact lenses which can be symmetrical or asymmetrical and further characterized as hard, flexible or soft, water-absorptive or non-water-absorptive.

The liquid lens-forming mixture can comprise monomer, prepolymer or prepolymer components. Particularly suitable components are hydrophilic monomers which preferably form slightly or moderately crosslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylmethacrylamide, and the like; N-vinylpyrrolidone; the alkyl substituted N-vinyl pyrrolidones, e.g., methyl-substituted N-vinylpyrrolidone; glycidyl methacrylate; glycidyl acrylate; mixtures thereof; and others known to the art. Also useful are the alkyl ether acrylates and methacrylates and the vulcanizable silicone fluids or elastomers. The alkyl moieties which are especially suitable in the aforementioned compounds are those which contain from 1 to 5 carbon atoms therein.

Hydrophobic monomers particularly useful in the practice of the invention to manufacture contact lenses include hydrophobic acrylic esters, suitably lower alkyl acrylic esters, preferably wherein the alkyl moiety contains 1–5 carbon atoms, such as methyl acrylate or methacrylate, ethyl acrylate or methacrylate, N-propyl acrylate or methacrylate, isopropyl acrylate or methacrylate, isobutyl acrylate or methacrylate, N-butyl acrylate or methacrylate, or mixtures thereof.

Preferred monomeric mixtures contain at least one alkylene glycol monoester of methacrylic acid, especially ethylene glycol monomethacrylate, and at least one crosslinking monomer such as the alkylene glycol diester of methacrylic acid, especially ethylene glycol dimethyacrylate. Such mixtures may contain other polymerizable monomers, desirably in minor amounts such as N-vinylpyrrolidone, methyl methacrylate, acrylamide, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerization or curing proceeds. Examples of such di- or polyfunctional species include: divinylbenzene, ethylene glycol diacrylate or dimethacrylate, propylene glycol diacrylate or dimethacrylate, and the acrylate or methacrylate polyesters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent, if employed, can comprise a minor amount of the reaction medium, i.e., less than about 50 weight percent.

Polymerization of monomer mixtures may be carried out with free radical catalysts of the type in common use in vinyl polymerization. Such catalyst species include organic peroxides, the alkyl percarbonates, hydrogen peroxides, and inorganic materials such as ammonium, sodium, or potassium persulfate. Polymerization using such catalysts may occur at temperatures between ambient temperature, e.g., about 20° C. and about 100° C., depending on the speed of polymerization desired.

Polymerization may also occur between monomer or prepolymer mixtures under the influence of elevated temperatures and/or radiation (U.V., x-ray, or other well-known forms of radioactivity) with/without well-known initiator(s).

Patents which further illustrate lens-forming materials useful in the preparation of contact lenses include, by way of examples, U.S. Re Nos. 27,401; 3,639,524; 3,699,089; 3,700,761; 3,822,089; 4,121,896; 4,208,365; and 4,223,984; the full disclosures of which are incorporated by reference as if set out in full text.

BRIEF DESCRIPTION OF DRAWING

The present invention will become more apparent from the following description thereof when considered together with the accompanying drawing which is set forth as being exemplary of embodiments of the present invention and is not intended in any way to be limited thereof and wherein:

FIG. 3 is a perspective view of a mold having a flange portion disclosed on its inner periphery.

FIG. 4 is a view taken along the lines 4—4 of FIG. 3.

FIG. 5 is a plan view of the pusher element shown in FIG. 1 showing however the pusher element in position to accommodate a mold.

FIG. 6 is a plan view of the jaw element shown engaging a portion of the mold.

FIG. 7 is a view looking down on the mold when advanced in position over the inlet to the column and showing the end portion of the pusher and jaw element accommodating the mold.

FIG. 8 is a view showing how the end of the pusher arm engages the flange portion of the mold to drive the mold into the inlet.

DETAILED DESCRIPTION OF DRAWING

Figure 1:
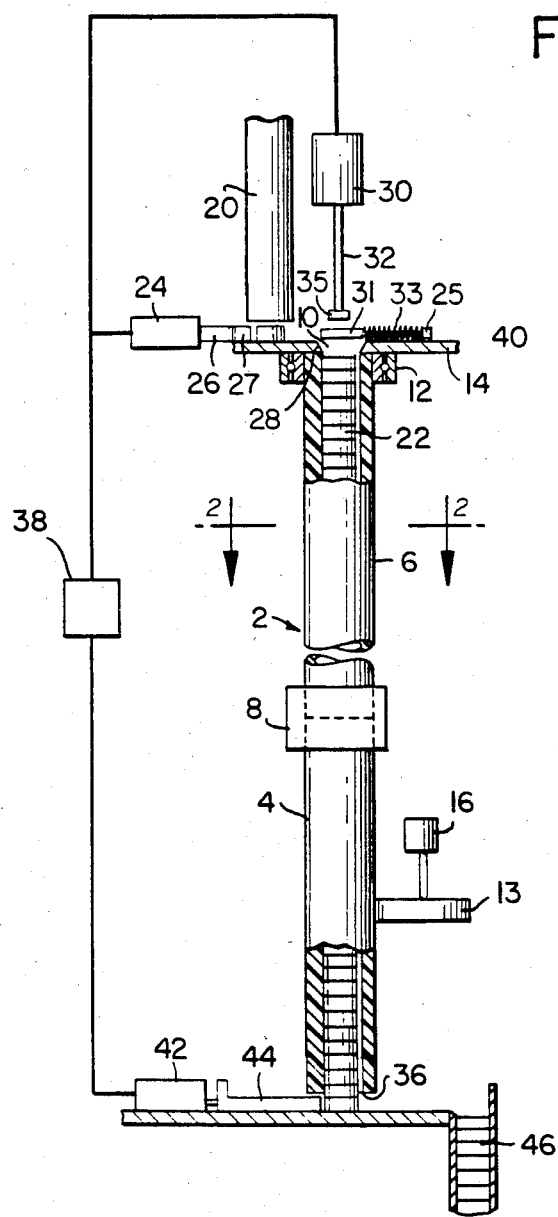
FIG. 1 is a semi-schematic side elevation view, partly in cross-section, of a device having the improved advancing and displacement means and which can be utilized for producing spin cast articles on a continuous basis.

Referring in detail to FIG. 1, there is shown a rotatable polymerization column 2 comprising a polymerization tube 4 having a conditioning tube 6 coaxially mounted above polymerization tube 4 and completed together using a conventional bearing 8. To maintain polymerization column 2 in a vertical position, the inlet end 10 is mounted in a conventional bearing 12 which in turn is secured to support member 14. A conventional motor 16 drives wheel 13 which in turn rotates polymerization column 2 at a desired speed required for the polymerization process to occur.

Figure 2:
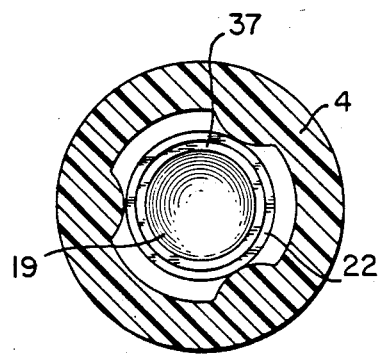
FIG. 2 is a cross-sectional view taken through line 2—2 of FIG. 1.

Disposed above support member 14 is mold magazine 20 containing a plurality of molds 22 each of which contain a metered amount of polymerizable or curable composition 19 as shown in FIG. 2.

A positive drive advancing means 24, conventionally operated by hydraulic, pneumatic or similar means, rests on support surface 14 and is disposed such that its pusher arm 26 is juxaposed mold 22 which has been ejected from magazine 20. Referring specifically to FIG. 5, it will be seen that pusher arm 26 has an end portion 27 of "U" shape configuration defining fingers 29 which are designed to accommodate mold 22 therebetween. Also slidably positioned on support 14 are jaw means including jaw element 31 slidably mounted on the support and which is spring biased away from inlet 10 when in non-operating position by means of spring member 33.

Jaw element 31 terminates in V shaped configuration as shown in FIGS. 6 and 7.

As best seen in FIG. 7, jaw element 31 and fingers 29 of end portion 27 cooperate by enveloping mold 22 in such a manner as to prevent horizontal angular displacement of mold 22 when the pusher arm 26 pushes mold 22 into engagement with the V shaped end of jaw element 31 so that mold 22 is in alignment with inlet opening 10.

Referring again to FIG. 1, it will be seen that support member 14 defines a slightly tapered opening 28 over the inlet end 10 of polymerization column 2, said opening 28 having a horizontal or lateral cross-sectional diameter equal to or larger than the horizontal or lateral cross-sectional diameter of mold 22. Disposed above opening 28 and inlet end 10 is a positive displacement drive means 30, conventionally operated by hydraulic, pneumatic, or similar means, having a pusher element 32. Pusher element 32 terminates in an end portion 35 preferably cylindrical and having a horizontal cross-sectional diameter slightly less than the horizontal cross-sectional diameter of mold 22 so that when extended, pusher element by its end portion 35 contacts shoulder 37 of mold 22 and will thus impart an even and uniform force on mold 22 and force feed said mold 22 into polymerization column 2. Since polymerization column 2 will generally be rotating, it is preferable to have pusher element 32 mounted on conventional ball bearing means or alternatively to have end portion 35 rotatable with respect to pusher element 32 so that it can freely rotate when feeding a mold 22 into rotating polymerization column 2.

In a representative mode of operation and utilizing the equipment described in the drawing as illustrative, mold 22 is shown disposed within polymerization tube 4 in an interference fit relationship. This restrains mold 22 from free-falling through polymerization tube 4 out through outlet end 36. In the operational mode, control means 38 (such as a step wheel, timer, cam arrangement or the like) synchronizes the activation of advancing means 24 and drive or displacement means 30 in a repeatable cycle such that pusher arm 26 with end portion 27 and fingers 29 is first advanced to accommodate and push a dosed mold 22 along support member 14 into V shaped jaw element 31. This causes mold 22 to be enveloped by boundaries formed by fingers 29 and the V shaped end of jaw element 31. The diameter of the mold 22 is such as to hold the V shaped end of jaw element 31 from contacting and touching fingers 29 of end portion 27. Spring 33 thereby causes the mold to be held firmly, contacted at points 56, 57 and 58 as shown in FIG. 7. The gap distance 55 is designed such that when mold 22 is pushed through into the rotating polymerization column, jaw element 31 moves only this gap distance before stopping against fingers 29. The inscribed circle between these mating jaws is larger in diameter than the diameter of end portion 35 of pusher element 32 so that there is no contact between jaw element 31 and end portion 35 (which contact would inhibit column rotation). The spring mechanism dimensions are such however that the mold will be securely held in horizontal position and will advance over opening 28. To facilitate the positioning of mold 22, a stop member can be provided which contacts the back portion of jaw element 31 to prevent mold 22 from being pushed beyond opening 28. With mold 22 advancing to position, displacement means 30 are automatically activated and the end portion 35 of pusher element 32 advances in the mold 22 and contacts the flange portion 37 (FIG. 8) to force mold 22 into the inlet end of polymerization column 2 where it advances the aligned molds within column 2 by an amount equal to the height of mold 22 thereby ejecting a mold 22 from the outlet end 36 of polymerization tube 4. The control means are set such that the time between cycles of advancing mold 22 over opening 28 and forcing it into polymerization column 2 is sufficient to permit the polymerizable or curable composition in the bottommost mold to substantially form into a predetermined shaped article.

Conventional discharge means 42 are disposed adjacent to the outlet end 36 of polymerization tube 4 such that its pusher arm 44 can advance ejected mold 22 containing the formed article into container 46 for collection. Discharge means 42 can also be coupled into control means 38 and activated following the force feeding of mold 22 into polymerization column 2 which causes mold 22 to be ejected. This will provide a complete automated device for producing spin cast articles, such as soft contact lenses, on a continuous basis.

Alternately, the discharge means 42 could be replaced by a conventional moving conveyor belt which would receive the ejected molds and advance them to a collection station where they could be fed into a container such as 46 shown in FIG. 1. In another technique, conventional sensing means such as photo-electric tubes, mechanical switches and the like, can be arranged about opening 28 so as to provide a signal to activate displacement means 30 when a mold is placed in alignment over opening 28.

What is claimed is:

1. An improvement in a device for the centrifugal casting symmetrical or asymmetrical contact lenses said device having a rotatable polymerization column adapted for accommodating a plurality of molds within said polymerization column; advancing means for positioning a mold containing a polymerizable or curable composition into alignment with the inlet end of said polymerization column; displacement means for feeding said advanced mold into said inlet end of said polymerization column; and control and motor means for operating said advancing means and displacement means and for rotating said column, the improvement wherein said advancing means include pusher means for advancing said mold into alignment with the inlet end of said column, said pusher means being adapted to accommodate a portion of said mold, and jaw means cooperating with said pusher means to envelope said mold in a manner such as to prevent horizontal angular displacement of said mold when said mold is in alignment with said inlet end and wherein said displacement means for feeding said advanced mold into said inlet includes an end portion adapted to be inserted into sad mold for directing said mold into said inlet portion of said column.

2. The improvement according to claim 1 wherein said pusher means include a pusher arm having a U shaped configuration.

3. The improvement according to claim 2 wherein said U shaped configuration defines a pair of fingers adapted to accommodate a portion of said mold in sliding relationship.

4. The improvement according to claim 1 wherein said jaw means includes an opposing spring loaded V jaw.

5. The improvement according to claim 4 wherein said opposing spring loaded V jaw is adapted to engage said mold before it arrives at a position where it could tilt into the inlet end of said polymerization column..

6. The improvement according to claim 1 wherein said displacement means include a freely rotatable end portion.

7. The improvement according to claim 6 wherein said freely rotatable end portion has an outer periphery generally corresponds in configuration to the configuration of the interior of said mold.

8. The improvement according to claim 7 wherein said end portion has a diameter less than the diameter of said mold.

9. The improvement according to claim 8 wherein said end portion further includes a terminal end and wherein said mold includes a flange portion disposed interiorly of said mold, said terminal end contacting said flange portion when said displacement means are urged towards said inlet to said column.

10. The improvement according to claim 2 wherein said jaw means includes an opposing spring loaded V jaw.

11. The improvement according to claim 10 wherein said opposing spring loaded V jaw is adapted to engage said mold before it arrives at a position where it could tilt into the inlet end of said polymerization column.

12. The improvement according to claim 2 wherein said displacement means include a freely rotatable end portion.

13. The improvement according to claim 12 wherein said freely rotatable end portion has an outer periphery generally corresponding in configuration to the configuration of the interior of said mold.

14. The improvement according to claim 13 wherein said end portion has a diameter less than the diameter of said mold.

15. The improvement according to claim 14 wherein said end portion further includes a terminal end and wherein said mold includes a flange portion disposed interiorly of said mold, said terminal end contacting said flange portion when said displacement means are urged towards said inlet to said column.

* * * * *